United States Patent
Boy

(10) Patent No.: US 9,282,757 B2
(45) Date of Patent: Mar. 15, 2016

(54) MODIFIED THAUMATIN PREPARATION

(71) Applicant: Charles Boy, Sandy (GB)

(72) Inventor: Charles Boy, Sandy (GB)

( * ) Notice: Subject to any disclaimer, the term of this patent is extended or adjusted under 35 U.S.C. 154(b) by 0 days.

(21) Appl. No.: 14/245,402

(22) Filed: Apr. 4, 2014

(65) Prior Publication Data

US 2015/0072061 A1    Mar. 12, 2015

Related U.S. Application Data

(63) Continuation of application No. 13/414,281, filed on Mar. 7, 2012, now abandoned.

(60) Provisional application No. 61/449,951, filed on Mar. 7, 2011.

(51) Int. Cl.
*A23L 2/60* (2006.01)
*A23L 1/236* (2006.01)

(52) U.S. Cl.
CPC ........... *A23L 1/2361* (2013.01); *A23V 2002/00* (2013.01)

(58) Field of Classification Search
CPC .................. A23V 2200/132; A23V 2250/266; A23V 2002/00; A23L 1/2361
USPC .................................. 426/548, 573, 524, 590
See application file for complete search history.

(56) References Cited

U.S. PATENT DOCUMENTS

2011/0097447 A1 *    4/2011    Roy et al. ..................... 426/66

* cited by examiner

*Primary Examiner* — Helen F Heggestad
(74) *Attorney, Agent, or Firm* — Heslin Rothenberg Farley & Mesiti P.C.

(57) ABSTRACT

The present invention relates to processes for preparing compositions containing thaumatin having desired properties. More particularly but not exclusively, it relates to compositions containing thaumatin having particular organoleptic properties, and to processes for their manufacture.

25 Claims, No Drawings

MODIFIED THAUMATIN PREPARATION

CROSS REFERENCE TO RELATED APPLICATION

This application is a continuation of U.S. patent application Ser. No. 13/414,281, filed Mar. 7, 2012, which claims priority from U.S. Provisional Patent Application No. 61/449,951, filed Mar. 7, 2011. The entire contents of each of the previous applications are hereby incorporated herein by reference.

FIELD OF THE INVENTION

The present invention relates to processes for preparing compositions containing thaumatin having desired properties. More particularly but not exclusively, it relates to compositions containing thaumatin having particular organoleptic properties, and to processes for their manufacture.

BACKGROUND OF THE INVENTION

The consumer demand for sweet-tasting products appears ever-increasing. However, the traditional naturally-derived sweeteners, particularly sucrose, suffer from the major drawbacks that they are high in energy content ("high in Calories"), leading to a risk of obesity and associated health problems. They are also associated with tooth decay.

There has hence been an enormous amount of work on developing synthetic sweeteners, which have little or no cariogenic effect, and which are far sweeter than sucrose, gram for gram, so that they may be used at lower levels, contributing fewer so-called "empty Calories" to the consumers' dietary intake. However, many of the products developed have proven to have undesirable properties, such as aftertaste, mouth feel or dietary intolerances amongst a substantial proportion of consumers. Additionally, to be as sure as possible that an artificial sweetener is safe (particularly in long-term use) requires lengthy and expensive testing.

There is hence also significant interest in alternative naturally-occurring sweeteners. Thaumatin is a particularly interesting example, with many advantages.

Thaumatin comprises a group of very closely related naturally-occurring proteins, each having a single polypeptide chain of 207 amino acid residues linked by 8 disulphide bridges, giving a molecular weight of around 22,000. There are no unusual or rarely-occurring amino acids in the chain, which means that hydrolysis (e.g. on digestion) is most unlikely to produce any substances associated with dietary intolerances.

Thaumatin is obtained from the West African plant *Thaumatococcus daniellii*. The Katemfe fruit from this plant has long been known as a source of sweetness, but was only reported in European scientific literature in 1855. It is now extracted on a commercial basis from Katemfe fruit, yielding a product that is roughly 2000 to 3000 times sweeter than sucrose (on a weight for weight basis). The effective "Calorie content" for a given sweetness level is hence close to zero. In line with the natural origin and long history of use of thaumatin, it is very widely approved for use as a sweetener and food additive. For example, the Food and Drug Administration (FDA) in the USA classifies thaumatin as GRAS (Generally Regarded As Safe). Thaumatin was approved in 1988 by the predecessor of EFSA (European Food Safety Agency) and in 1985 by the Joint FAO/WHO Expert Committee on Food Additives. Under the relevant European Directives, thaumatin may be used as a sweetener at certain maximum levels, depending on the food category involved, while when used as a flavour enhancer it can be used in any food made under GMP (Good Manufacturing Practice). Thaumatin has passed every animal and human safety study carried out to date, with no adverse reactions observed.

Thaumatin is also stable in freeze-dried form and in solution in water or aqueous alcohol. It survives pasteurisation and UHT processing conditions, and as a coating has survived dry temperatures up to 140° C. In aqueous solution, it is stable over a wide pH range. Thaumatin appears to have no cariogenic effects.

Thaumatin is not a complete replacement for sucrose, however. While it produces an intense sweetness, this is recognisably different to that of sucrose. The onset of the sweet taste is often delayed, while the perception of sweetness can then linger for longer than for sucrose. At high usage levels, a liquorice-like aftertaste can remain.

Nevertheless, thaumatin has several further properties that distinguish it from other natural and artificial sweeteners.

It has been found to act synergistically with other low-calorie sweeteners, producing significantly higher perceived sweetness than would be expected from the levels of thaumatin and the other sweetener present.

Additionally, thaumatin has been found to be more effective in masking many bitter, sour or metallic tastes than would be expected from its sweetness alone. This is beneficial both in foods (the metallic aftertaste of saccharine can be masked in addition to synergetically enhancing sweetness) and in pharmaceuticals (where many active components delivered by mouth have unpleasant tastes).

Thirdly, thaumatin enhances a wide range of non-sweetener flavour compounds, including savoury flavours, and in particular those considered "aggressive". One example is the boosting of coffee flavour without generating bitter notes. In savoury products, there appears to be a more complex enhancement, involving synergies with natural flavour enhancers, such as 5' nucleotides and monosodium glutamate (MSG). Thus, the taste element known from Japanese as "umami" can be enhanced without engaging the health risks perceived in some quarters from high MSG contents.

Thaumatin may thus be considered as much a flavour enhancer as it is a simple sweetener. However, it would still be beneficial if thaumatin could be "tailored" to produce any one of the above effects more than the others, it being rare to require all of the above properties at once. One might also for example wish to enhance a savoury taste without introducing noticeable sweetness, or enhance sweetness without masking a sour or bitter note. On the other hand, it is both a real and a perceived advantage of thaumatin that it is a natural plant extract, so chemical modification of the protein chain, for example, is unlikely to be an acceptable approach.

The process for extracting thaumatin essentially proceeds as follows (a more complete description is given in the examples below).

The flesh of the Katemfe fruit is excised from the seeds and is frozen for transport and storage. This flesh is "mashed" in an aqueous extraction step, filtered and treated with caustic soda. After sedimentation, the supernatant is decanted off, filtered and then concentrated and purified by membrane techniques. The concentrate is then induced to crystallise by reducing the temperature to well below 0° C. The crystals are vacuum-dried, granulated by ball-milling, sieved and blended with materials such as maltodextrin, gum arabic, lactose and the like to produce a convenient dry powder product containing a standard level of thaumatin protein.

It would be beneficial if variations in said conventional production process could be used to modify selectively the balance of properties of the thaumatin compositions produced.

It is hence an object of the present invention to provide a process for the production of thaumatin compositions that provides some or all of the above benefits and obviates some or all of the above problems. It is also an object of the present invention to provide thaumatin compositions having said modified properties.

SUMMARY OF THE INVENTION

According to a first aspect of the present invention, there is provided a method for the production of a composition comprising thaumatin, comprising the step of so cooling an aqueous solution containing dissolved thaumatin as to cause crystallisation of thaumatin therefrom, wherein said aqueous solution additionally comprises at least 5% by weight of one or more water-soluble carbohydrate compounds.

Preferably, said one or more water-soluble carbohydrate compounds comprise at least one polysaccharide.

For purposes of this application, the term "carbohydrate compounds" generally refers to all carbohydrates except those that might be considered natural gums.

Natural gums may include, but are not limited to, agar, alginic acid, beta-glucan, carrageenan, cassia gum, chicle gum, dammar gum, gellan gum, glucomannan, guar gum, gum arabic, gum ghatti, gum tragacanth, karaya gum, locust bean gum, mastic gum, psyllium seed husks, sodium alginate, spruce gum, tamarind gum, tara gum, and xanthan gum. In certain embodiments of the invention, the natural gum is a polyelectrolyte natural gum.

Preferably, said aqueous solution further comprises up to 1% by weight of a water-soluble metal salt.

Advantageously, said metal salt comprises a halide. Said metal salt may comprise an alkali metal. Said metal salt may comprise an alkaline earth metal.

Said aqueous solution may have a pH of greater than 3, optionally of greater than 5.

The method preferably comprises the step of reducing the temperature of the aqueous solution to −15° C. or below.

The method may further comprise the step of reducing the temperature of the aqueous solution to an initial temperature between 0° C. and 5° C. and maintaining it at said initial temperature for at least ten minutes, prior to said step of reducing the temperature of the aqueous solution to −15° C. or below.

According to a second aspect of the present invention, there is provided a method for the production of a composition comprising thaumatin, said composition being adapted for use as a sweetness enhancer, comprising the step of so cooling an aqueous solution containing dissolved thaumatin as to cause crystallisation of thaumatin therefrom, wherein said aqueous solution additionally comprises greater than 5% by weight of a water-soluble carbohydrate compound. Preferably, said aqueous solution comprises up to 15% by weight of said carbohydrate compound. Advantageously, said aqueous solution comprises between 7.5% and 12.5% by weight of said carbohydrate compound. The carbohydrate compound may comprise a polysaccharide, optionally a poly (dextrose).

Preferably, said aqueous solution further comprises at least 1% by weight of a water-soluble natural gum. Advantageously, said aqueous solution may then comprise up to 15% by weight of said natural gum. Said natural gum may comprise gum arabic.

Said aqueous solution preferably contains at least 10% by weight of thaumatin protein. Advantageously, said aqueous solution comprises up to 20% by weight of thaumatin protein. The aqueous solution may comprise between 12.5% and 17.5% by weight of thaumatin protein.

Preferably, said aqueous solution additionally comprises up to 1% by weight of a water-soluble metal salt. Advantageously, said metal salt comprises a halide. Said metal salt may comprise an alkali metal.

Preferably, said aqueous solution has a pH of at least 5. Advantageously, said aqueous solution has a pH of 7 or lower.

Said aqueous solution may have a temperature prior to cooling of at least 25° C., optionally up to 35° C. Preferably, said step of cooling the aqueous solution comprises reducing the temperature of the aqueous solution to −15° C. or below, optionally to −25° C. or below. Advantageously, said step of cooling the aqueous solution comprises reducing the temperature of the aqueous solution over a period of at least 20 minutes, optionally over at least 30 minutes.

According to a third aspect of the present invention, there is provided a composition comprising thaumatin, adapted for use as a sweetness enhancer, comprising thaumatin crystals produced according to a method as described in the second aspect above.

According to a fourth aspect of the present invention, there is provided a method for the production of a composition comprising thaumatin, said composition being adapted to enhance salty, umami and other savoury flavours, comprising the step of so cooling an aqueous solution containing dissolved thaumatin as to cause crystallisation of thaumatin therefrom, wherein said aqueous solution additionally comprises at least 5% by weight of a water-soluble natural gum. Preferably, said aqueous solution comprises up to 15% by weight of said water-soluble natural gum. Advantageously, said aqueous solution comprises between 7.5% and 12.5% by weight of said water-soluble natural gum. Said water-soluble natural gum may comprise gum arabic.

Preferably, said aqueous solution further comprises at least 1% by weight of a water-soluble carbohydrate compound. Advantageously, the aqueous solution may then comprise up to 5% by weight of said water-soluble carbohydrate compound. Said carbohydrate compound may comprise a polysaccharide, optionally a poly (dextrose).

Said aqueous solution preferably comprises up to 10% by weight thaumatin protein. Advantageously, said aqueous solution comprises at least 1% by weight thaumatin protein. The aqueous solution may comprise between 3 and 8% by weight thaumatin protein.

Preferably, said aqueous solution additionally comprises up to 1% by weight of a water-soluble metal salt. Advantageously, said metal salt comprises a halide. Said metal salt may comprise an alkali metal. Said metal salt may comprise an alkaline earth metal.

Preferably, said aqueous solution has a pH of at least 2. Advantageously, said aqueous solution has a pH of 5 or lower.

Said aqueous solution may have a temperature prior to cooling of up to 25° C. Preferably, said step of cooling the aqueous solution comprises reducing the temperature of the aqueous solution to −15° C. or below.

The step of cooling the aqueous solution may comprise reducing the temperature of the aqueous solution over a period of at least 30 minutes, optionally over at least 40 minutes. Advantageously, the method further comprises an initial conditioning step, prior to said step of cooling the aqueous solution, wherein the aqueous solution is held at a temperature between 0° C. and 5° C. for at least 20 minutes, optionally for up to 60 minutes.

According to a fifth aspect of the present invention, there is provided a composition comprising thaumatin, said composition being adapted to enhance salty, umami and other savoury flavours, and comprising thaumatin crystals produced according to a method as described in the fourth aspect above.

According to a sixth aspect of the present invention, there is provided a method for the production of a composition comprising thaumatin, said composition being adapted to mask sour and bitter flavours, comprising the step of so cooling an aqueous solution containing dissolved thaumatin as to cause crystallisation of thaumatin therefrom, wherein said aqueous solution additionally comprises at least 10% by weight of a water-soluble natural gum.

Preferably, said aqueous solution comprises up to 15% by weight of said water-soluble natural gum. Advantageously, said aqueous solution comprises between 12% and 14% by weight of said water-soluble natural gum. Said water-soluble natural gum may comprise gum arabic.

Preferably, said aqueous solution further comprises at least 1% by weight of a water-soluble carbohydrate compound. Advantageously, the aqueous solution may then comprise up to 5% by weight of the water-soluble carbohydrate compound. Said carbohydrate compound may comprise a polysaccharide, optionally a poly (dextrose).

Said aqueous solution preferably comprises at least 10% by weight thaumatin protein. Advantageously, said aqueous solution comprises up to 15% by weight thaumatin protein. The aqueous solution may comprise between 12% and 14% by weight thaumatin protein.

Preferably, said aqueous solution comprises up to 1% by weight of a water-soluble metal salt. Advantageously, said metal salt comprises a halide. Said metal salt may comprise an alkali metal. Said metal salt may comprise an alkaline earth metal.

Preferably, said aqueous solution has a pH of at least 5. Advantageously, said aqueous solution has a pH of 7 or lower.

Said aqueous solution may have a temperature prior to cooling of at least 25° C., optionally up to 35° C. Preferably, said step of cooling the aqueous solution comprises reducing the temperature of the aqueous solution to −15° C. or below. Advantageously, said step of cooling the aqueous solution comprises reducing the temperature of the aqueous solution over a period of at least 30 minutes, optionally at least 40 minutes.

The method may further comprise an initial conditioning step, prior to said step of cooling the aqueous solution, wherein the aqueous solution is held at a temperature between 0° C. and 5° C. for at least 20 minutes, optionally for up to 60 minutes.

According to a seventh aspect of the present invention, there is provided a composition comprising thaumatin, said composition being adapted to mask sour and bitter flavours, and comprising thaumatin crystals produced according to a method as described in the sixth aspect above.

DETAILED DESCRIPTION OF THE INVENTION

Embodiments of the present invention will now be more particularly described by way of example.

The existing process for extracting thaumatin and producing commercially-usable compositions comprising thaumatin generally has the following sequence of steps.

Excision of arils of the fruit of *Thaumatacoccus danielii*: the Katemfe fruit is not a true "fruit", but comprises the "aril", a fleshy sac covering or attached to each seed (more familiar examples may be the edible "seeds" of the pomegranate, or the so-called yew "berry"). Thaumatin is naturally secreted in the aril, and there are well known cultivation techniques to produce high and reliable thaumatin levels therein.

Rapid freezing of discrete excised arils, followed by bulk freezing for transport and cold storage of the arils.

The first extraction step is an aqueous "mashing" of the arils, which is followed by a primary filtration of the mash liquor.

Caustic treatment of the filtered liquor comprises treatment with sodium hydroxide, followed by a settlement/sedimentation step. The thaumatin remains in solution in the supernatant.

The supernatant is decanted and cleaned of remaining suspended solids by a filtration step, followed by an ultrafiltration step.

Membrane concentration and membrane purification steps are then carried out, to produce a highly concentrated solution of substantially pure thaumatin. The thaumatin concentration may be up to 20% w/v at this stage, and the pH has typically fallen to the range pH2.5 to pH3.0.

This "critical solution" is then induced to form crystals of thaumatin by reducing its temperature to well below 0° C. (a final temperature of −20° C. may be employed, for example). This precipitates a very high proportion of the thaumatin as a crop of fine crystals.

Vacuum drying of the separated crystals is carried out at temperatures ranging from the crystallisation temperature up to ambient temperature or slightly above.

The dried crystals are granulated to a desired particle size by ball-milling, followed by dry sieving to remove oversize particles (typically using a 60 mesh to 80 mesh sieve) and blending with suitable bulking agents such as maltodextrin, gum arabic or lactose powders (as appropriate to the planned end-use) to give a thaumatin composition containing a desired % w/w of thaumatin protein.

The methods of the present invention differ from the above known production method mainly in the composition of the critical solution prior to crystallisation, although non-standard temperature profiles for the crystallisation step have also been found to be of benefit.

In some embodiments, the aqueous solution comprises 1) about 10% to about 20% by weight of thaumatin, 2) about 5% to about 15% by weight of a water-soluble carbohydrate compound, 3) about 1% to about 15% of a water-soluble natural gum, and 4) is at a pH between about 5 and 7. These embodiments provide increased enhancement of the sweet taste of other sweeteners.

In a first example embodying the present invention, a thaumatin composition providing increased enhancement of the sweet taste of other sweeteners was prepared by modifying the above prior art procedure from the pre-crystallisation "critical solution" onwards.

The critical solution in this first example comprised:

| | |
|---|---|
| Thaumatin protein | 15% |
| Maltodextrin | 10% |
| Gum arabic | 8% |
| Sodium chloride | 0.5% |
| pH | 6 |
| Temperature | 30° C. |

The remainder of the critical solution comprised water. Percentages are expressed as percentages by weight of the critical solution as a whole.

The crystallisation step was then carried out by reducing the temperature to −25° C. over a period of approximately 30 minutes.

Vacuum drying of the resultant crop of crystals was carried out at temperatures gradually rising from −25° C. up to ambient temperature, completing drying at 22° C.

The dried crystals were ball-milled under standard conditions, sieved and the sub-80 mesh fraction was blended with maltodextrin to give a series of thaumatin-containing compositions containing a range of known levels of thaumatin protein.

When the thaumatin compositions of the first example were compared in organoleptic tests with thaumatin compositions made conventionally, the compositions of the first example produced significantly greater enhancement of the sweetness of other sweeteners than conventional compositions, at the same net levels of thaumatin protein by weight.

In some embodiments, the aqueous solution comprises 1) about 1% to about 10% by weight of thaumatin, 2) about 1% to about 5% by weight of a water-soluble carbohydrate compound, 3) about 5% to about 15% of a water-soluble natural gum, and 4) is at a pH between about 2 and 4. These embodiments provide increased enhancement of salt and umami taste.

In a second example embodying the present invention, a thaumatin composition providing improved enhancement of salt and "umami"/MSG flavours was prepared by modifying the above prior art procedure from the pre-crystallisation "critical solution" onwards.

The critical solution of this second example comprised:

| | |
|---|---|
| Thaumatin protein | 6% |
| Maltodextrin | 3% |
| Gum arabic | 10% |
| Sodium chloride | 0.5% |
| pH | 3 |
| Temperature | 25° C. |

The remainder of the critical solution comprised water. Percentages again expressed by weight.

The crystallisation step in this example was carried out in two stages. The temperature of the critical solution was initially reduced to 2 to 4° C. and maintained in that range for a dwell time of about 45 minutes. The critical solution was then reduced further in temperature, reaching a minimum temperature of −15° C. after a further period of approximately 30 minutes.

Vacuum drying of the resultant crop of crystals was carried out at temperatures gradually rising from −15° C. up to ambient temperature, completing drying at 22° C.

The dried crystals were ball-milled under standard conditions, sieved and the sub-60 mesh fraction was blended with gum arabic to give a series of thaumatin-containing compositions containing a range of known levels of thaumatin protein.

Organoleptic tests were carried out to compare the thaumatin compositions of the second example with thaumatin compositions made conventionally. In this example, the tests compared the enhancement of a "savoury" flavour, comprising a salty flavour and a MSG/"umami" flavour. A target savoury flavour could be achieved with lower levels of salt/MSG, with lower levels of thaumatin protein, or lower levels of both. Higher levels of thaumatin could be used without introducing a noticeable sweet taste.

In some embodiments, the aqueous solution comprises 1) about 10% to about 15% by weight of thaumatin, 2) about 1% to about 5% by weight of a water-soluble carbohydrate compound, 3) about 10% to about 15% of a water-soluble natural gum, and 4) is at a pH between about 5 and 7. These embodiments provide improved masking of bitter and/or sour taste.

In a third example embodying the present invention, a thaumatin composition providing improved masking of bitter/sour tastes, was prepared by modifying the above prior art procedure from the pre-crystallisation "critical solution" onwards.

The critical solution of the third example comprised:

| | |
|---|---|
| Thaumatin protein | 13% |
| Maltodextrin | 2% |
| Gum arabic | 13% |
| Sodium chloride | 0.5% |
| pH | 6 |
| Temperature | 30° C. |

The remainder of the critical solution comprised water, and percentages are again expressed by weight.

The crystallisation step in the third example was then carried out in two stages. The temperature of the critical solution was initially reduced to 2 to 4° C., and was maintained in that range for a dwell time of about 40 minutes. The critical solution was then cooled further, reaching a minimum temperature of −15° C. after a period of approximately 30 minutes.

Vacuum drying of the resultant crop of crystals was carried out at temperatures gradually rising from −15° C. up to ambient temperature, completing drying at 22° C.

The dried crystals were ball-milled under standard conditions, sieved and the sub-80 mesh fraction was blended with maltodextrin to give a series of thaumatin-containing compositions containing a range of known levels of thaumatin protein.

Organoleptic tests were carried out to compare the thaumatin compositions of the third example with the thaumatin compositions made conventionally. In this example, the masking of a series of sour and/or bitter tastes was examined. The thaumatin compositions of the third example showed significantly greater masking effect against such tastes than did the conventionally-produced compositions.

At present, it is believed that it is the composition and pH of the critical solution that has the main effect on the organoleptic performance of the resulting composition, while the crystallisation temperature profile is probably modifying the physical crystal form and size as much as it affects the particular crystal form of the thaumatin. The current theory is that thaumatin has a sufficiently complex structure that crystallisation in the presence of other species (particularly saccharides) may result in a range of subtly different crystals forms with differing organoleptic properties.

While the above examples use mainly maltodextrin and gum arabic, other polysaccharides may be used, such as poly(dextroses) with a range of DE (Dextrose Equivalent) values, or starches or modified starches. Instead of gum arabic, xanthan gum or gum tragacanth might be used. Potassium chloride may be used in place of sodium chloride, and in the second and third examples, magnesium chloride may be used (NB but not for a sweetness enhancer composition, as in the first example).

The invention claimed is:

1. A method for the production of a composition comprising thaumatin, comprising the step of so cooling an aqueous solution containing at least 1% by weight of dissolved thaumatin protein as to cause crystallisation of thaumatin from said aqueous solution, wherein said aqueous solution additionally comprises at least 5% by weight of at least one water-soluble carbohydrate compound.

2. A method as claimed in claim 1, wherein said water-soluble carbohydrate compound comprises a polysaccharide.

3. A method as claimed in claim 1, wherein said water-soluble carbohydrate compound comprises a poly(dextrose) compound.

4. A method as claimed in claim 1, wherein said aqueous solution further comprises at least 1% by weight of a water-soluble natural gum.

5. A method as claimed in claim 4, wherein said natural gum comprises gum arabic.

6. A method as claimed in claim 1, wherein said aqueous solution additionally comprises up to 1% by weight of a water-soluble metal salt.

7. A method as claimed in claim 1, wherein said aqueous solution has a pH of at least 5.

8. A method as claimed in claim 1, wherein said aqueous solution additionally comprises at least 1% by weight of a water-soluble natural gum, and up to 1% by weight of a water-soluble metal salt.

9. A method according to claim 8 wherein said aqueous solution has a pH of at least 5.

10. A method for the production of a composition comprising thaumatin, comprising the step of so cooling an aqueous solution containing at least 1% by weight of dissolved thaumatin protein as to cause crystallisation of thaumatin from said aqueous solution, wherein said aqueous solution additionally comprises at least 5% by weight of a water-soluble natural gum.

11. A method as claimed in claim 10, wherein said aqueous solution further comprises at least 1% by weight of a water-soluble carbohydrate compound.

12. A method as claimed in claim 10, wherein said aqueous solution additionally comprises up to 1% by weight of a water-soluble metal salt.

13. A method as claimed in claim 10, wherein said aqueous solution has a pH of less than 5.

14. A method as claimed in claim 10, wherein said aqueous solution additionally comprises at least 1% by weight of a water-soluble carbohydrate compound, and up to 1% by weight of a water-soluble metal salt.

15. A method according to claim 14, wherein said aqueous solution has a pH of less than 5.

16. A method for the production of a composition comprising thaumatin comprising the step of so cooling an aqueous solution containing at least 1% by weight of dissolved thaumatin protein as to cause crystallisation of thaumatin from said aqueous solution, wherein said aqueous solution additionally comprises at least 10% by weight of a water-soluble natural gum.

17. A method as claimed in claim 16, wherein said aqueous solution further comprises at least 1% by weight of a water-soluble carbohydrate compound.

18. A method as claimed in claim 16, wherein said aqueous solution additionally comprises up to 1% by weight of a water-soluble metal salt.

19. A method as claimed in claim 16, wherein said aqueous solution has a pH of at least 5.

20. A method as claimed in claim 16, wherein said aqueous solution additionally comprises at least 1% by weight of a water-soluble carbohydrate compound, and up to 1% by weight of a water-soluble metal salt.

21. A method according to claim 20, wherein said aqueous solution has a pH of at least 5.

22. A composition comprising an aqueous solution, wherein said aqueous solution comprises at least 1% by weight of dissolved thaumatin protein, greater than 1% by weight of a water-soluble carbohydrate compound, at least 1% by weight of a water-soluble natural gum, and up to 1% by weight of a water-soluble metal salt.

23. A composition comprising an aqueous solution according to claim 22, wherein said aqueous solution comprises at least 1% by weight of dissolved thaumatin protein, greater than 5% by weight of a water-soluble carbohydrate compound, at least 1% by weight of a water-soluble natural gum, and up to 1% by weight of a water-soluble metal salt.

24. A composition comprising an aqueous solution according to claim 22, wherein said aqueous solution comprises at least 1% by weight of dissolved thaumatin protein, greater than 1% by weight of a water-soluble carbohydrate compound, at least 5% by weight of a water-soluble natural gum, and up to 1% by weight of a water-soluble metal salt.

25. A composition comprising an aqueous solution according to claim 22, wherein said aqueous solution comprises at least 1% by weight of dissolved thaumatin protein, greater than 1% by weight of a water-soluble carbohydrate compound, at least 10% by weight of a water-soluble natural gum, and up to 1% by weight of a water-soluble metal salt.

* * * * *